3,553,076
NON-CATALYTIC PROCESS FOR THE PRODUCTION OF CELLULOSE FROM LIGNOCELLULOSIC MATERIALS USING ACETIC ACID
Gerrit G. De Haas and Charles J. Lang, Longview, Wash., assignors to Weyerhaeuser Company, Tacoma, Wash., a corporation of Washington
Filed Jan. 22, 1968, Ser. No. 699,580
Int. Cl. D21c 3/20
U.S. Cl. 162—76                    13 Claims

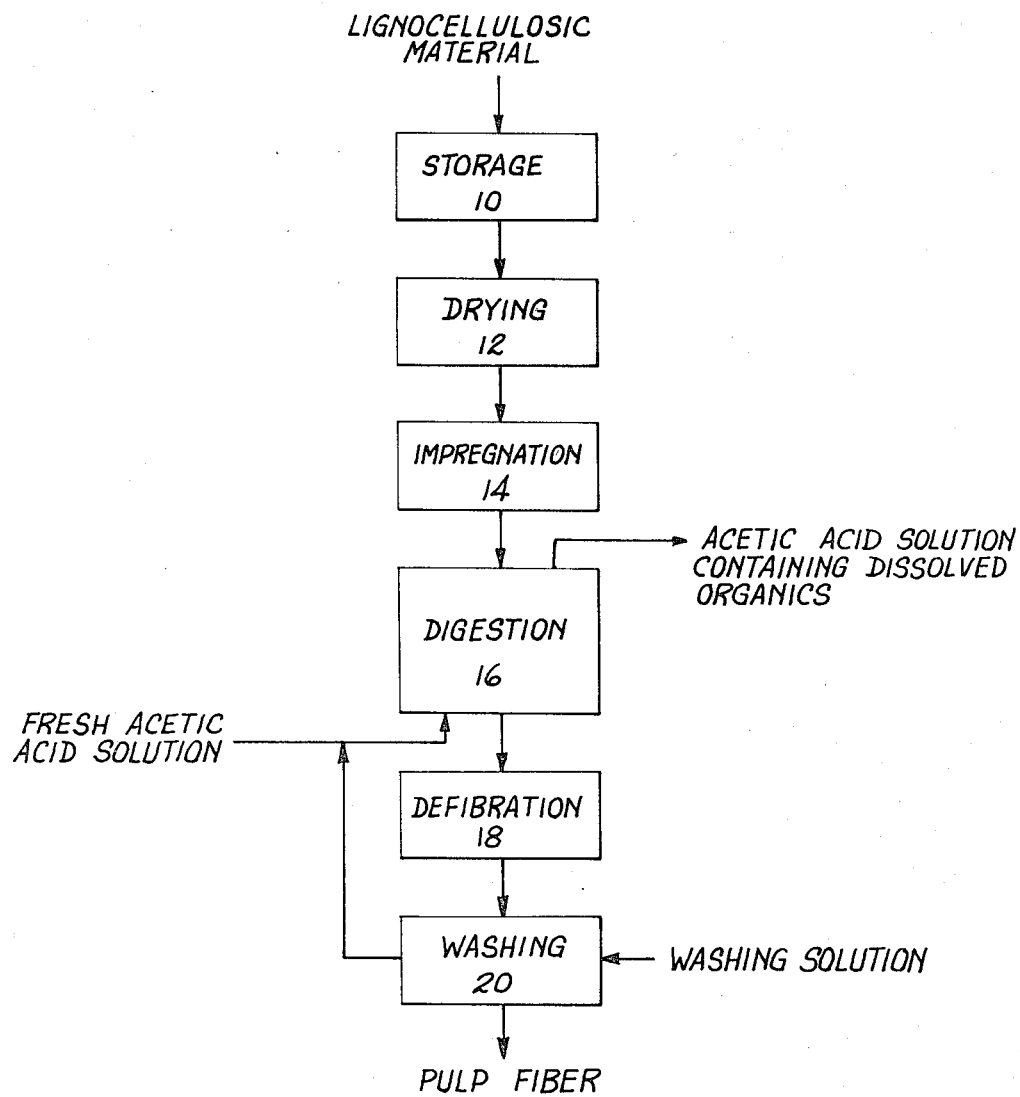

ABSTRACT OF THE DISCLOSURE

A non-catalytic process for producing cellulose from lignocellulosic materials by delignifying the lignocellulosic materials with a solution containing at least 50% by weight of acetic acid at a temperature between 150° C. and 205° C. Preferably the process is carried out on a continuous basis with countercurrent contact of the acetic acid solution and the lignocellulosic material.

BACKGROUND OF THE INVENTION

(1) Field of the invention

This invention relates to a chemical process for liberating natural cellulose from lignocellulosic materials using acetic acid as the treating chemical.

(2) Prior art relating to the invention

Liberation of cellulose fiber from wood and other lignocellulosic materials has been carried out by numerous chemical means. Perhaps the two most well known processes for producing cellulose are the kraft and the sulfite pulping processes. These two processes form the backbone of the pulping industry as it exists today. A major disadvantage of the sulfite process is in the large volume of waste products produced. Although a great many advances have been made in utilization of these by-products, they constitute a serious disposal problem, especially as regards water pollution. The kraft pulping process, while not having as many disadvantages as the sulfite process, produces great billows of malodorous fumes, volatile sulfur compounds, and particulates originating from the inorganic pulping chemicals which pollute the air. With the increasingly stringent water and air pollution laws promulgated by both state and federal governments, industry is being forced to either devise and utilize expensive pollution control systems with existing processes or devise new ways of liberating cellulose without the attendant pollution problem at a competitive cost with existing processes.

Unconventional solvent pulping methods have been utilized to remove lignin from wood and other lignocellulosic materials. Such solvents as dioxane, polyglycols, ethanol, butanol, glycerol, phenol, and mineral acids, such as hydrochoric and nitric acid, have been used. These processes have generally been unattractive for industrial purposes because of the cost of the solvent through inevitable solvent losses and because pulp quality did not meet expectations.

Pulping lignocellulosic materials with acetic acid in the presence of mineral acid catalysts is known, as described in an article by L. E. Herdle et al., entitled "Acetylation Celluloses From Pulping of Wood in Acetic Acid," published in TAPPI, volume 47, No. 10, October 1964, pages 617 to 620. Canadian Patent 737,374; and U.S. Patent No. 2,511,096 also describe pulping with acetic acid in the presence of catalysts. The use of catalysts requires separation and recovery thereof at some point in the process, an operation which is not necessary with the present process. Other advantages can also be obtained by not using a catalyst.

BRIEF SUMMARY OF THE INVENTION

This invention relates to solvent pulping of lignocellulosic materials with acetic acid. Catalysts are not necessary to obtain pulp of the desired quality. A solution containing a major amount of acetic acid, that is, at least 50% by weight, is used to contact lignocellulosic material in a subdivided state, the liquid-to-wood weight ratio in the digestion zone ranging from about 1:1 to 12:1. The system is heated to a temperature between 150° C. to 205° C. for a time sufficient to substantially delignify the lignocellulosic material, usually a time ranging from ½ hour at the higher temperature to 16 hours at the lower temperature. The lignocellulosic material is delignified by continuous or batchwise extraction by the acetic acid-containing solution.

BRIEF DESCRIPTION OF THE DRAWING

The figure is a flow diagram illustrating one method of processing lignocellulosic material according to this invention.

DETAILED DESCRIPTION OF THE INVENTION

Pulping with acetic acid has many advantages. Acetic acid is a natural component of wood with the amount varying in different species. In contrast to the conventional kraft and sulfite processes, the lignin present in lignocellulosic materials can be liberated from the cellulose fiber with acetic acid without consumption of the treating chemical.

Wood is composed essentially of cellulose, hemicelluloses, lignin, minor amounts of extractives and mineral constituents, the amounts dependent on the species in question. The extractives in wood include such materials as turpentine and tall oil. Acetic acid is present in wood linked to the other organic compounds as acetyl groups. Acetic acid is a solvent for lignin and substantially all of the extractives. It is also a solvent for a portion of the hemicelluloses present in wood under certain processing conditions. Removal of, or partial retention of the hemicelluloses is one factor determinative of the type pulp desired.

That pulp of good quality could be obtained with substantially complete delignification and with comparatively little or no degradation of cellulose, was unexpected. A non-catalytic process, such as described, presents interesting possibilities in that highly reactive lignin can be recovered. Also, carbohydrates can be recovered and utilized in various ways. The process is also essentially pollution-free when coupled with a suitable recovery system for the acetic acid solvent as compared to conventional pulping processes using substantial quantities of inorganic sulfur compounds, which are plagued by serious air pollution problems in the form of fly ash and obnoxious, odorous sulfur compounds. No loss of treating chemical occurs in the process of this invention as occurs with conventional kraft and sulfite processes.

Lignocellulosic materials, primarily wood, in subdivided state, constitute the principal raw material. Obviously, in addition to wood, other materials such as bagasse and kenaf may be used. The material may be in the form of chips, sawdust or planar shavings. The wood species is not critical in that softwoods, hardwoods, and tropical species can be pulped by this process. Exemplary of the woods which may be used are deciduous woods, such as aspen, birch, alder, poplar, beech, cottonwood, sweet gum, maple; coniferous woods, such as spruce, Douglas fir, hemlock, balsam fir, pine; and tropical species such as lauan and eucalyptus.

The extractant liquid used to delignify the lignocellulosic material is an acetic acid solution containing a major amount of acetic acid. The solution may contain from 0 to 50 weight percent water with the remainder being essentially acetic acid. The presence of excess water is detrimental to obtaining good quality pulp as water, to a certain degree, hydrolyzes cellulose. Water also slows down the delignification process and may cause precipitation of the lignin. It is preferable to limit the amount of water present in the system to 15 weight percent or less. Keeping the amount of water at a low level also aids in recovery of the acetic acid solvent.

As the extractant for the organic compounds, acetic acid, is also the pulping chemical, there is always an excess of acid present. In kraft and sulfite processes, the active chemicals make up only a small part of the solution used to extract the organic material. Since the quantity of active chemical is limited in these conventional processes, occasional exhaustion occurs resulting in socalled "burnt cooks." This problem is not encountered when pulping with acetic acid.

Control of water in the system can be accomplished in a number of ways, including (1) drying the lignocellulosic material to a low moisture content before discharging it into the digestion zone, (2) adding desiccants, such as acetic anhydride, to the system, or (3) extraction with water miscible, low boiling solvents which can be easily separated from water, such as methanol or acetone.

During pulping the lignin present in the wood is dissolved along with a certain amount of the hemicelluloses and other extractives. The amount of hemicelluloses dissolved is dependent on the pulping operations and the species of wood. Some acetylation of the cellulose occurs and the amount increases the yield and is sold with the pulp. A certain amount of methyl acetate is formed during pulping with acetic acid by reaction of the acetic acid with the methoxy groups in the wood. It is well known that methyl acetate can be hydrolyzed to form methanol and acetic acid. Another known technique involves conversion of one mole of carbon monoxide with one mole of methyl acetate to form two moles of acetic acid. This source of acetic acid plus that formed from the acetyl groups already present in the wood compensates partly and possibly completely for any acetic acid lost during recovery operations. The acetyl content, it should be understood, varies widely with the type lignocellulosic material used.

The liquid-lignocellulosic weight ratio in the digestion zone may vary widely. Enough liquid and acetic acid should be used to dissolve a sufficient amount of lignin and other solubles present in the lignocellulosic material to produce the quality pulp desired. The upper limit is a matter of economics. A weight ratio of liquid to lignocellulosic material (oven-dry basis) in the digestion zone of 1:1 to 12:1 and preferably 2:1 to 8:1 is desirable.

The temperature which should be maintained in the digestion zone ranges from about 150° C. to 205° C., and preferably from 175° C. to 190° C. While a temperature less than 150° C. can be used the process is slow and uneconomical. Above about 205° C., considerable lignin condensation and polymerization occurs, resulting in lowering of the solubility of the lignin in the acetic acid solvent.

The time required for adequate pulping is dependent on the liquid-lignocellulosic weight ratio, ratio of water to acetic acid, the species of wood, and the digestion temperature. At the higher temperature range, good pulp can be obtained in about 30 minutes, while at lower temperatures as long as 16 hours may be necessary. As an example, at a 3:1 liquid-to-wood ratio using an 85:15 ratio of acetic acid to water and a digestion zone temperature of between 175° C. to 185° C., pulping times ranging from 2 to 5 hours were found to be adequate.

Referring now to the flow diagram, the figure illustrates wood chips being taken from a storage zone 10 to a drying zone 12 where the chips are dried to a residual moisture content of from 4 to 50% by weight. Rotary heated drums or other conventional drying equipment may be used. Solvent extraction of moisture and extractives in the wood may be employed at this point if desired. From the drying zone the chips are fed to an impregnation or presteaming zone 14. Although presteaming is not necessary, it aids in the rapid and complete impregnation of the chips with acetic acid and also helps prevent air from entering the system. Acetic acid vapor and/or acetic anhydride is used for impregnation. Acetic acid vapor supplied by the vent gases of the digester may be used. The presteamed chips are then fed into digester zone 16. The digester used may be of any configuration. For example, the digester may have several extraction zones wherein the volume of liquid flowing upwardly in the different extraction zones may be varied in combination with temperature control to control pulp quality. The digester can also be made in a manner such that acetic acid can be introduced at different temperatures, in liquid or vapor form, to the various zones. The acetic anhydride may be added in the digestion zone. After discharging from the digestion zone 16 the substantially delignified pulp is subjected to defibration in defibration zone 18 by an impeller or defibrator. The pulp may then be diluted before being sent to washing zone 20 where equipment is used to screen out knots and separate the dissolved organics as thoroughly as possible from the pulp fiber. For example, a set of countercurrent washers or presses can be employed, using fresh acetic acid, other solvent or solvent mixture which does not tend to reprecipitate the dissolved organic materials.

A further aspect of this invention is in the countercurrent extraction of organics, such as lignin and carbohydrates from the lignocellulosic material in the digestion zone. Countercurrent flow of acetic acid solvent and lignocellulosic material is preferred and has many advantages. The acetic acid-containing liquid is preferably introduced into the bottom of the digester where it contacts lignocellulosic material which is substantially or fully delignified. As the dissolved lignin and other solubles are removed from the lignocellulosic material they are moved upwardly in the digester to the point of injection of the lignocellulosic material. As the lignocellulosic material descends through the digestion zone in the digester it contacts liquid having less dissolved lignin and other solubles. After digestion the liquid extracted from the pulp by washing, pressing, or otherwise, is suitable for reinjection into the digestion zone. Because the wash liquid may also be the extractant, the extraction and washing zones may be combined within the digester.

It is preferred to heat the acetic acid-containing liquid prior to introduction into the digester. The liquid should be heated to a temperature at or near the temperature of digestion. Preheating of the acetic acid solvent eliminates the possibility of "hot spots" in, for example, heat exchangers used to raise the temperature. "Hot spots" may occur if the solvent is introduced into the digester at or near room temperature and the digester subsequently heated to the appropriate cooking temperature.

Bleaching agents may be added directly to the fresh solvent entering the digester in desired amounts. Such bleaching agents may include hydrogen peroxide or acetic acid peroxide.

Pulp obtained by the described process has excellent qualities. Depending on the cooking conditions employed high strength pulps as well as dissolving pulps can be obtained. Pulp strength is developed rapidly with little refining required.

The pulp after digestion or washing can be left for extended periods of time in contact with the acetic acid solution without degradation of the fiber. Also, the pulp may be treated with an alkali such as caustic to remove any acetyl groups.

Small amounts of catalytic agents may be present in the digestion zone by reason of their presence in the lignocellulosic material to be digested; however, these amounts do not substantially affect the non-catalytic nature of the process.

Example I.—To Douglas fir chips containing about 50.7% by weight O.D. wood was added an acetic acid solution containing about 85% by weight acetic acid. The liquid to wood ratio was 8:1. The system was heated to either 150° C. or 180° C. as shown in Table I for a time ranging from four to eight hours. After heating the acetic acid solution containing the dissolved lignin and other extractives was drained from the wood fiber and the wood fiber washed first with acetic acid and then with fresh water. The yield of pulp and pulping conditions are shown in Table I.

TABLE I

| Example | Wood | Liquid-wood wt. ratio | Time, hrs. | Temp., °C. | Yield, percent |
|---|---|---|---|---|---|
| 1-A | Douglas fir | 8:1 | 5 | 150 | 71.6 |
| 2-A | do | 8:1 | 8 | 150 | 62.4 |
| 3-A | do | 8:1 | 4 | 180 | 48.8 |
| 4-A | do | 8:1 | 8 | 180 | 74.6 |

Example II.—Additional experiments were carried out as described in Example I using wood chips of Douglas fir and hemlock. The conditions of pulping are shown in Table II and the properties of the pulp prepared under the conditions outlined in Table II are shown in Table III. A typical kraft pulp, pulped under the conditions given, is also included for comparison.

TABLE II

| Example | Type wood | Acetic acid-water wt. ratio | Liquid wood wt. ratio | Digestion time hrs.:min. | Temp., °C. | Total yield, percent | Canadian std. freeness |
|---|---|---|---|---|---|---|---|
| 1-B | Douglas fir | 85:15 | 7.0 | 5:00 | 180 | 50.1 | 633 |
| 2-B | Hemlock | 85:15 | 7.3 | 5:00 | 180 | 45.1 | 695 |
| 3-B | do | 85:15 | 7.3 | 7:00 | 180 | 45.6 | 685 |
| 4-B | Douglas fir (kraft process) | | 4.5 | 2:30 | 173 | 44.0 | 660 |

TABLE III.—PULP PROPERTIES

| Example | Density, g./cc. | Burst strength, pts./26 lbs. | Tensile Stretch p.s.i. | Stretch, percent | Rupture energy, ergs./g. | Tear factor | Fold M.I.T. | C.L.T. | Porosity. sec./100 ml, |
|---|---|---|---|---|---|---|---|---|---|
| 1-B | 0.717 | 111 | 59.1 | 2.60 | 128 | 8.57 | 3,123 | 21.4 | 158 |
| 2-B | 0.742 | 144 | 66.0 | 2.05 | 120 | 6.19 | 8,490 | 21.6 | 197 |
| 3-B | 0.808 | 158 | 77.9 | 2.50 | 152 | 6.29 | 7,257 | 22.7 | 184 |
| 4-B | 0.688 | 85 | 42.4 | 2.60 | 110 | 12.1 | 2,504 | 19.2 | 30 |

Example III.—Several batch experiments were carried out using oven-dry hemlock chips under various pulping conditions as shown in Table IV. Good quality pulp was obtained.

TABLE IV

| | 1-C | 2-C | 3-C |
|---|---|---|---|
| Liquid-wood, wt. ratio | 7.5 | 7.5 | 7.5 |
| Acetic acid-water, wt. ratio | 96:4 | 88:12 | 92:8 |
| Time, hrs | 4 | 4 | 4 |
| Temp., °C | 180-185 | 180-185 | 180-185 |
| Refining, min | 18 | 5 | 5 |
| Freeness, Canadian std | 645 | 605 | 630 |
| Yield, percent | 53.1 | 46.8 | 48.7 |
| Density, g./cc. | 0.752 | 0.844 | 0.804 |
| Burst, pts./26 lbs | 125 | 136 | 141 |
| Tensile strength, p.s.i | 56.4 | 71.9 | 75.1 |
| Stretch, percent | 2.20 | 2.64 | 2.80 |
| Rupture energy, ergs./g | 104 | 162 | 172 |
| Tear factor | 5:64 | 5$10 | 5$60 |
| Fold, M.I.T | 3,553 | 7,272 | 12,166 |
| C.L.T | 16.6 | 16.6 | 20.0 |
| Porosity, sec./100 ml | 110 | 439 | 218 |

Example IV.—Experiments were made wherein the acetic acid-containing solution was introduced into the bottom of the digester countercurrent to the flow of oven-dry hemlock chips which were introduced into the digester from the top. Actic acid solution having about 7% dissolved solids was removed continuously from the upper portion of the digester. Pulping conditions, quality of the pulp, and the amount of acid-insoluble lignin are listed in Table V.

TABLE V

| | 1-D | 2-D | 3-D | 4-D | 5-D |
|---|---|---|---|---|---|
| Liquid-wood, wt. ratio | 7.5 | 7.5 | 7.5 | 5 | 7.5 |
| Acetic acid-water, wt. ratio | 88:12 | 88:12 | 88:12 | 88:12 | 88:12 |
| Time, hrs | 5 | 4 | 2 | 2 | 1 |
| Temp., °C | 180-185 | 180-185 | 180-185 | 190-193 | 190-193 |
| Refining, min | 9 | 11 | 22 | 10 | 13 |
| Freeness, Canadian std | 590 | 605 | 540 | 585 | 655 |
| Yield, percent | 49.7 | 47.9 | 49.1 | 47.2 | 50.6 |
| Density, g./cc. | 0.817 | 0.824 | 0.758 | 0.791 | 0.680 |
| Burst, pts./26 lbs | 146 | 146 | 115 | 133 | 120 |
| Tensile strength, p.s.i | 71.5 | 75.7 | 65.5 | 66.7 | 60.3 |
| Stretch, percent | 2.98 | 3.04 | 2.64 | 2.18 | 2.55 |
| Rupture energy, ergs./g | 172 | 183 | 143 | 120 | 131 |
| Tear factor | 4.60 | 5.29 | 4.27 | 4.23 | 5.23 |
| Fold, M.I.T | 4,347 | 1,885 | 893 | 8,766 | 3,011 |
| C.L.T | 12.6 | 19.0 | 20.4 | 17.0 | 18.1 |
| Porosity, sec./100 ml | 543 | 228 | 292 | 513 | 48 |
| Acid insoluble lignin, percent | 5.7 | 5.9 | | 4.5 | |

Example V.—Additional experiments were made using oven-dry alder chips under various process conditions given in Table VI. Hand sheets prepared from the pulp had properties outlined in Table VII. Corrugating medium was also made from the pulp and had properties as outlined in Table VIII.

TABLE VI.—PULPING CONDITIONS

| | 1-E, batch | 2-E, batch | 3-E, countercurrent | 4-E, countercurrent |
|---|---|---|---|---|
| Liquid-wood, wt. ratio | 7.5 | 7.5 | 7.5 | 7.5 |
| Acetic acid-water, wt. ratio | 8.0 | 8.0 | 8.0 | 8.0 |
| Time, hrs | 4 | 2¾ | 2 | 2½ |
| Temp., °C | 180-185 | 180-185 | 180-185 | 180-185 |
| Refining, min | 0 | 11 | 14 | 12 |

TABLE VII.—PULP QUALITY—HAND SHEETS

| | 1-E | 2-E | 3-E | 4-E |
|---|---|---|---|---|
| Freeness, Canadian std | 600 | 473 | 582 | 534 |
| Yield, percent | 49.1 | 50.6 | 57.0 | 55.7 |
| Density, g./cc. | 0.786 | 0.892 | 0.783 | 0.825 |
| Burst, pts./26 lbs | 76 | 102 | 73 | 87 |
| Tensile strength, p.s.i | 52.2 | 57.4 | 52.3 | 59 |
| Stretch, percent | 1.72 | 2.28 | 1.88 | 2.00 |
| Rupture energy, ergs./g | 79 | 118 | 84 | 105 |
| Tear factor | 3.04 | 3.65 | 1.92 | 2.15 |
| Fold, M.I.T | 180 | 2,248 | 128 | 615 |
| C.L.T | 14.2 | 21.5 | 17.5 | 16.7 |
| Porosity, sec./100 ml | 75 | 381 | 54 | 131 |

TABLE VIII.—CORRUGATING MEDIUM

|  | 1-E | 2-E | 3-E | 4-E |
|---|---|---|---|---|
| Density, g./cc | 0.772 | 0.885 | 0.765 | 0.804 |
| Burst, pts./26 lbs | 75 | 98 | 68 | 88 |
| Tensile strength, p.s.i | 50.6 | 63.2 | 50.2 | 53.5 |
| Stretch, percent | 1.84 | 2.56 | 1.70 | 1.68 |
| Rupture energy, ergs./g | 85 | 146 | 76 | 75 |
| Fold, M.I.T | 167 | 2,146 | 152 | 404 |
| Porosity, sec./100 ml | 53 | 345 | 40 | 109 |
| Concora | 63 | 70 | 68 | 68 |

What is claimed is:

1. A non-catalytic process for producing cellulose from lignocellulosic material comprising
   (a) introducing into a digestion zone containing the lignocellulosic material an acid solution containing essentially water and at least 50% by weight of acetic acid in the absence of a catalyst, and in an amount ranging from 1:1 to 12:1 weight ratio of acid solution to lignocellulosic material, and
   (b) digesting the lignocellulosic material at a temperature between 150° C. and 205° C. to substantially delignify said material.

2. Process according to claim 1 wherein the acetic acid is present in the acid solution in a concentration of at least 85% by weight.

3. A continuous, non-catalytic process for producing cellulose from lignocellulosic material without substantial degradation of the cellulose which comprises
   (a) continuously introducing the lignocellulosic material into a digestion zone in subdivided condition,
   (b) continuously introducing a solution containing essentially water and at least 50% by weight of acetic acid in the absence of a catalyst into the digestion zone countercurrent to the flow of lignocellulosic material in the digestion zone so that substantially digested lignocellulosic material contacts said acetic acid solution having a relatively low concentration of dissolved organics, and undigested lignocellulosic material contacts said acetic acid solution having a relatively high concentration of dissolved organics,
   (c) maintaining an acetic acid solution to lignocellulosic material weight ratio in the digestion zone of between 1:1 to 12:1,
   (d) maintaining the digestion zone at a temperature ranging from 150° C. to 205° C. for a time ranging from 16 hours to ½ hour, and
   (e) discharging the digested material from the digestion zone.

4. Process according to claim 3 including the step of defibrating the digested lignocellulosic material.

5. Process according to claim 3 including the step of washing the digested lignocellulosic material with substantially fresh acetic acid solution.

6. Process according to claim 5 wherein the acetic acid solution used to wash the digested lignocellulosic material is reinjected into the digestion zone.

7. Process according to claim 3 wherein the lignocellulosic material is dried to a moisture content of between 4 to 50% prior to injection into the digestion zone.

8. Process according to claim 3 including, prior to the introduction of the lignocellulosic material into the digestion zone, removing substantially all the extractives in the lignocellulosic material by extraction with a low-boiling, water miscible solvent.

9. Process according to claim 3 wherein acetic anhydride is injected into the digestion zone.

10. Process according to claim 3 wherein a bleaching agent is injected into the digestion zone.

11. Process according to claim 3 wherein the acetic acid is present in the acetic acid solution in a concentration of at least 85% by weight.

12. Process according to claim wherein the lignocellulosic material, prior to injection into the digestion zone, is impregnated with acetic acid vapor and/or acetic anhydride.

13. A non-catalytic, continuous process for producing cellulose from wood without substantial dergadation of the cellulose which comprises,
   (a) continuously introducing the wood in a subdivided condition into the digestion zone,
   (b) continuously introducing a solution containing essentially water and at least 50% by weight acetic acid in the absence of a catalyst into the digestion zone countercurrent to the flow of wood in the digestion zone,
   (c) maintaining an acetic acid to wood weight ratio in the digestion zone of between 3:1 to 8:1,
   (d) maintaining the digestion zone at a temperature ranging from 150° C. to 190° C. for a time ranging from 16 hours to ½ hour, and
   (e) discharging the digested wood from the digestion zone.

References Cited
UNITED STATES PATENTS

| 2,106,797 | 2/1938 | Dreyfus | 162—76X |
| 2,511,096 | 6/1950 | Bate | 162—76X |
| 2,893,909 | 7/1959 | Snouvlin et al. | 162—28X |
| 3,193,445 | 7/1965 | Parker et al. | 162—76 |

OTHER REFERENCES

Wood Chemistry, Wise & Jahn, 2nd ed., vol. 1, 1952, p. 436.

S. LEON BASHORE, Primary Examiner

A. L. CORBIN, Assistant Examiner

U.S. Cl. X.R.

162—77, 78

PO-1050
(5/69)

UNITED STATES PATENT OFFICE
CERTIFICATE OF CORRECTION

Patent No. 3,553,076      Dated January 5, 1971

Inventor(s) GERRIT G. DE HAAS AND CHARLES J. LANG

It is certified that error appears in the above-identified patent and that said Letters Patent are hereby corrected as shown below:

In column 3, lines 24 & 25, "desiccants" should read --dessicants--;

in column 5, Table III, "Tensile Stretch" should read --Tensile Strength--;

in column 5, Table IV, Tear factor, "5:64, 5$10, 5$60" should read --5.64, 4.10, 5.60--;

in column 6, Table V, Liquid-wood, wt. ration, Col. 4-D, "5" should read --7.5--;

in column 8, line 18, "claim" should read --claim 3--; and in column 8, line 23, "dergadation" should read --degradatio Signed and sealed this 15th day of June 1971.

(SEAL)
Attest:

EDWARD M. FLETCHER, JR.
Attesting Officer

WILLIAM E. SCHUYLER, JR.
Commissioner of Patents

Disclaimer 3,553,076.—*Gerrit G. De Haas* and *Charles J. Lang*, Longview, Wash. NON-CATALYTIC PROCESS FOR THE PRODUCTION OF CELLULOSE FROM LIGNOCELLULOSIC MATERIALS USING ACETIC ACID. Patent dated Jan. 5, 1971. Disclaimer filed Apr. 3, 1972, by the assignee, *Weyerhaeuser Company*.

Hereby enters this disclaimer to claims 1, 3, 4, 5, 6, 7, 8, 9, 10, 12 and 13 of said patent.

[*Official Gazette July 11, 1972.*]